United States Patent [19]
Zumbragel

[11] Patent Number: 5,431,808
[45] Date of Patent: Jul. 11, 1995

[54] DEVICE FOR ODOR FILTERING OF EXHAUST AIR FROM WASTE WATER TREATMENT

[75] Inventor: Michael Zumbragel, Aarbergen, Germany

[73] Assignee: Passavant-Werke AG, Germany

[21] Appl. No.: 925,280

[22] Filed: Aug. 6, 1992

[30] Foreign Application Priority Data

Aug. 6, 1991 [DE] Germany .............. 41 26 010

[51] Int. Cl.$^6$ .............................................. C02F 3/30
[52] U.S. Cl. ...................... 210/188; 210/218; 210/320; 95/92
[58] Field of Search ............... 210/616–618, 210/150, 151, 218, 320, 188; 95/92

[56] References Cited

U.S. PATENT DOCUMENTS

| | | | |
|---|---|---|---|
| 3,216,905 | 11/1965 | Baptist | 195/2 |
| 4,302,236 | 11/1981 | Roman | 210/609 |
| 5,240,611 | 8/1993 | Burton | 210/617 |

FOREIGN PATENT DOCUMENTS

3341374 1/1989 Germany .
3524029 1/1992 Germany .

OTHER PUBLICATIONS

Pomeroy, Richard D.: Biological treatment of odorous air. In: Journal WPCF 54, 1982, S. 1541–1545, Dec. 1982.

Primary Examiner—Thomas Wyse
Attorney, Agent, or Firm—Larson and Taylor

[57] ABSTRACT

The waste water which is discharged from the anaerobic treatment stages of biological waste water treatment plants still contains highly volatile organic substances which, if not biodegraded, escape into the ambient air and lead to unwelcome odors. Also, the exhaust air of the anaerobic treatment stage may contain such highly volatile substances. An escape into the ambient air can be prevented if the waste water which is discharged from the anaerobic treatment stage is aerated with exhaust air sucked off from the anaerobic stage and if this exhaust air, after the aeration, is then fed to a spray washer and compost filter. The water for the spray washer is taken from the discharge of the anaerobic stage and returns there.

4 Claims, 1 Drawing Sheet

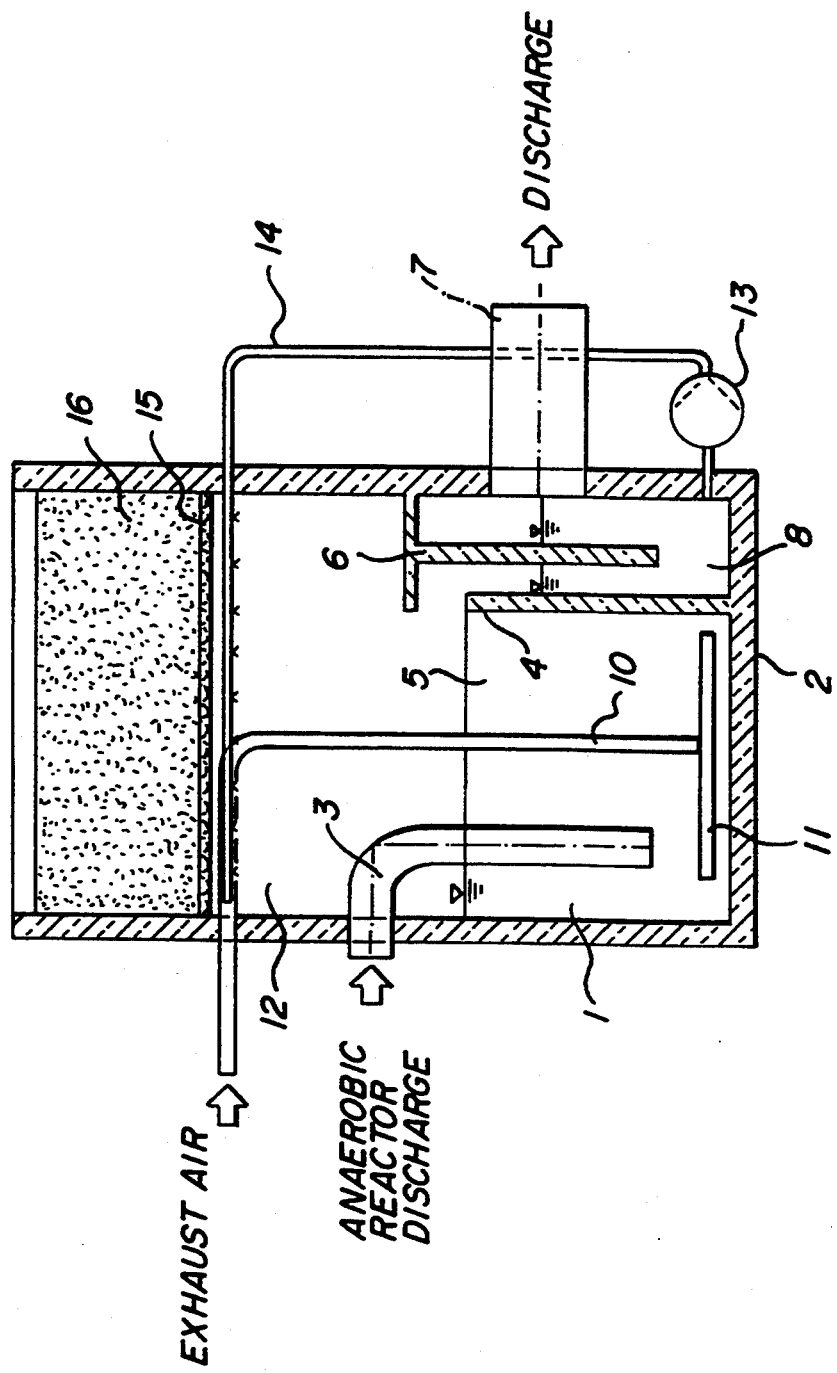

DEVICE FOR ODOR FILTERING OF EXHAUST AIR FROM WASTE WATER TREATMENT

The invention relates to a process for retaining highly volatile organic substances escaping from discharged waste water treated in the anaerobic treatment stages of biological waste water treatment plants.

In the anaerobic stages of biological waste water treatment plants, highly volatile organic components are formed which, if no activation stage follows the anaerobic stage, escape from the discharge into the ambient air and cause unpleasant odors. Such substances are also contained in the exhaust air of the anaerobic stage itself. It is the known and presently standard practice to collect the discharged waste water in a shaft structure in order to aerate it there for a longer period in order to immediately stop the anaerobic decomposition processes responsible for the formation of the highly volatile odorous substances and to expel the highly volatile substances in a controlled manner. Another practiced possibility is the total capping of all treatment pools, and the filtering of the entire waste water in a compost filter. Expenditures for this measure are very high.

According to the invention, the task of optimizing the problems associated with exhaust air are solved by using as aeration air for the anaerobic waste water the exhaust air sucked from the anaerobic stage, and by treating the aeration air in a spray washer after the former has passed through the waste water. It is preferred that the water for the spray treatment is removed from the waste water leaving the anaerobic stage and is returned there after the spray treatment. In the process, an extraordinary amount of equipment space is saved if the spray treatment stage is located above the aeration treatment stage and below the compost filter. The exhaust air then flows through the spray treatment stage and compost filter using the shortest path.

The figure shows an especially suitable device for performing this process, described below in detail using the drawing of a section through the apparatus.

The water discharged from the anaerobic reactor (not shown) is fed via a submerged pipe (3) to the pool-like lower part (1) of the device (2). A weir (4) on the discharge side ensures a defined water volume (5) with a defined staying time. An odor lock (8) formed by a submerged wall (6) in front of the discharge (7) prevents the passage of gases and vapors.

Exhaust air from the anaerobic stage is blown via a submerged pipe (10) and standard commercial compressed air aerators (11) into the discharge pool (1). Odor-intensive substances contained in the exhaust air are first dissolved in the waste water. Undissolved parts are then washed out in a spray stage (12) which is fed with the water removed from the odor lock (8) (pump 13). The spray pipes (14) are located directly below the screen top (15) carrying the compost filter (16). Both exhaust air and waste water leave the device in an essentially odor-free state. The air blown into the aeration zone causes aerobic decomposition processes which are also odorless.

I claim:

1. An apparatus for preventing highly volatile organic substances in waste water which has been treated in anaerobic biological treatment installations from escaping into ambient air comprising:
    an aeration tank for holding waste water discharged from an anaerobic biological treatment installation, said tank having an inlet pipeline, a discharge pipeline and a waste gas outlet;
    an odor lock adjacent said discharge pipeline for preventing passage of gases and vapors from said aeration tank into the ambient air;
    an aeration unit in said aeration tank for passing exhaust air from an anaerobic biological treatment installation through said waste water in said aeration tank; and
    a compost filter positioned in said waste gas outlet for filtering and retaining volatile components in exhaust gas passing therethrough.

2. The apparatus according to claim 1 further comprising a spray washer system comprising:
    a pipeline extending from a base of the tank to the top of the tank;
    nozzles in said pipeline positioned at the top of said aeration tank and below said compost filter; and
    a pump for pumping aerated waste water from said odor lock and through said nozzles to create spray water through said exhaust air in said tank.

3. The apparatus according to claim 2 further comprising an overflow weir positioned in said tank for holding a defined volume of water in said aeration tank.

4. The apparatus according to claim 3 wherein said odor lock is formed by said overflow weir, a discharge weir and a baffle positioned therebetween, said odor lock being shielded from said spray water.

* * * * *